N. DU BRUL.
Cigar-Mold.

No. 203,715.          Patented May 14, 1878.

Attest
Walter Knight
A. H. Galt.

Inventor
Napoleon Du Brul
By Knight Bros.
Attor'ys

UNITED STATES PATENT OFFICE.

NAPOLEON DU BRUL, OF CINCINNATI, OHIO.

IMPROVEMENT IN CIGAR-MOLDS.

Specification forming part of Letters Patent No. 203,715, dated May 14, 1878; application filed February 11, 1878.

*To all whom it may concern:*

Be it known that I, NAPOLEON DU BRUL, of Cincinnati, Hamilton county, Ohio, have invented a new and useful Improvement in Cigar-Molds, of which the following is a specification:

The object of my invention is to afford a mold for the manufacture of cigar-fillings, which combines the advantages of cheapness and efficiency to a greater degree than any hitherto or now placed upon the market. This I accomplish by combining with a wooden lower half-mold an upper half-mold whose matrix-faces are formed of sheet metal.

Figure 1:
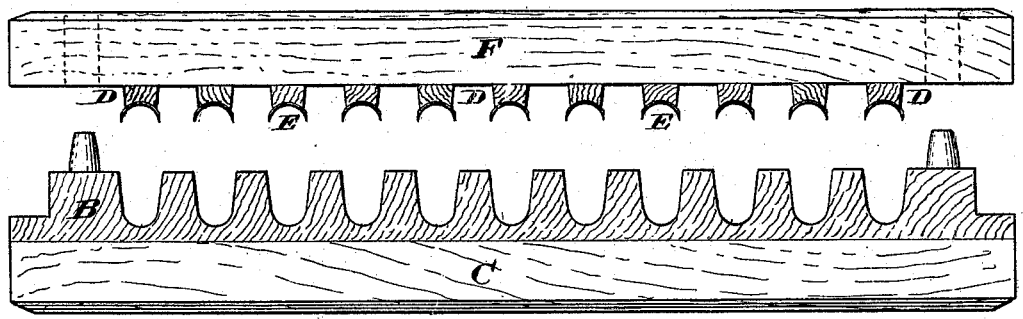
Figure 2:
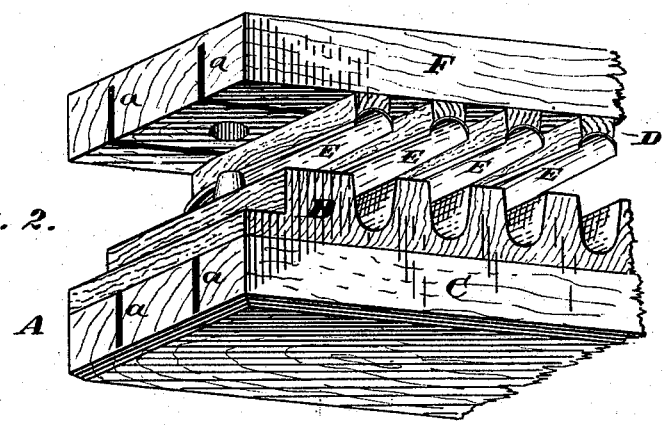
Figure 3:
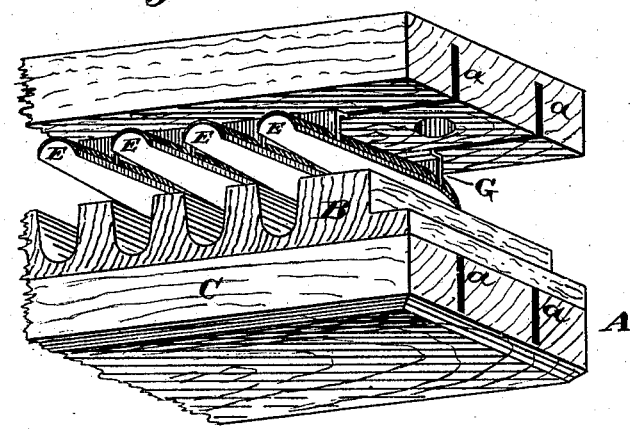

In the accompanying drawings, Figure 1 is a side elevation of a mold embodying my invention, the two halves or members of the mold being shown separated. Fig. 2 is a perspective view of a portion of the same viewed from below. Fig. 3 represents a modification.

A represents a lower half-mold, whose matrix-block B is formed of beech, cherry, or other hard wood, having its grain longitudinal of the matrices. Glued to the rear of the block B is a backing, C, of pine or other cheap wood, which, before being applied to the block B, is intersected on its glue-face with deep saw kerfs or channels *a* in direction of its grain.

D represents the wooden blocks of the upper matrices, and E represents the upper matrices proper, the same consisting of trough-like pieces of thin sheet metal, such as common tin, corresponding to the half of a cigar-filling.

F represents a backing for the upper half-mold, similar in every respect to the backing C, and having similar grooves *a*.

Instead of the blocks D, I may provide legs G, which, being soldered to the backs of the facings, enter and are secured within the grooves *a*.

As the chief value of the use of sheet metal for cigar-molds exists in the ability to produce a male mold with sharp, durable, and elastic feather-edges, the lower or female mold may be wholly of wood, thus securing the most important advantages of the metal at a slight expense, and producing a mold that combines the economical advantages of the strictly wooden mold with the efficiency of the metallic ones.

I am aware that cigar-molds have been made whose matrix-faces in both members have been metallic, and also that cigar-molds have long been made wholly of wood; but the former class are somewhat costly, while the latter are very destructible, especially with respect to the sharp feather-edges of the upper member.

By the use of wood for the lower matrices or main-mold cavities, I avail myself of the absorbent quality of this material, as well as the economical advantages above set forth.

By the use of sheet metal for the facing of the upper member, I avail myself to the fullest extent of the elasticity and durability of this material at trifling expense. At the same time I completely avoid the difficulty commonly experienced from the swelling of wooden followers by the dampness of the tobacco, causing them to stick in the lower-mold cavities, and thus rendering the mold difficult to separate.

I claim as new and of my invention—

A cigar-mold whose lower half or member is formed wholly of wood, and whose upper half is formed with sheet-metal matrix-faces, substantially as and for the purpose set forth.

In testimony of which invention I hereunto set my hand.

NAPOLEON DU BRUL.

Attest:
GEO. H. KNIGHT,
L. H. BOND.